United States Patent [19]
Stets et al.

[11] Patent Number: 5,721,373
[45] Date of Patent: Feb. 24, 1998

[54] PNEUMATIC FUSION JOINT TEST SYSTEM AND METHOD

[75] Inventors: Joseph A. Stets, Gahanna; Sudheer M. Pimputkar, Columbus, both of Ohio

[73] Assignee: Gas Research Institute, Chicago, Ill.

[21] Appl. No.: 640,281

[22] Filed: Apr. 30, 1996

[51] Int. Cl.⁶ .................................................. G01M 3/28
[52] U.S. Cl. ......................................... 73/46; 73/49.8
[58] Field of Search ............................ 73/46, 49.8, 49.1

[56] References Cited

U.S. PATENT DOCUMENTS

| | | | |
|---|---|---|---|
| 2,462,575 | 2/1949 | Walker | 73/40 X |
| 2,572,613 | 10/1951 | Goff | 85/1 |
| 2,682,796 | 7/1954 | Larson | 81/52.5 |
| 3,213,673 | 10/1965 | Schulhoff, Sr. | 73/49.2 |
| 3,444,732 | 5/1969 | Robbins et al. | 73/150 |
| 3,479,072 | 11/1969 | Kosar | 287/52.08 |
| 3,501,993 | 3/1970 | Swenson et al. | 85/1 |
| 3,826,646 | 7/1974 | Karlsson et al. | 75/13 |
| 3,952,691 | 4/1976 | Peltz et al. | 116/65 |
| 3,978,881 | 9/1976 | Mouranie | 137/318 |
| 4,025,371 | 5/1977 | Pecha | 156/64 |
| 4,040,289 | 8/1977 | Clark et al. | 73/46 |
| 4,078,833 | 3/1978 | Carter | 73/46 X |
| 4,352,708 | 10/1982 | McElroy | 156/378 |
| 4,467,636 | 8/1984 | Dagn | 73/49.8 |
| 4,513,605 | 4/1985 | Hawerkamp | 73/40 |
| 4,533,424 | 8/1985 | McElroy | 156/378 |
| 4,657,626 | 4/1987 | Cearlock et al. | 156/580 |
| 4,664,001 | 5/1987 | Denman | 81/479 |
| 4,712,809 | 12/1987 | Legris | 285/21 |
| 4,715,214 | 12/1987 | Tveter et al. | 73/49.2 |
| 4,759,225 | 7/1988 | Reynertson et al. | 73/862.21 |
| 4,791,839 | 12/1988 | Bickford et al. | 81/479 |
| 4,809,735 | 3/1989 | Volgstadt et al. | 137/318 |
| 4,822,203 | 4/1989 | Walmsley | 403/314 |
| 4,899,684 | 2/1990 | Houzvic et al. | 116/272 |
| 4,940,259 | 7/1990 | Williams et al. | 285/3 |
| 4,949,744 | 8/1990 | Heed | 137/15 |
| 4,951,697 | 8/1990 | Fritts | 137/68.1 |
| 4,958,541 | 9/1990 | Annis et al. | 81/479 |
| 5,172,616 | 12/1992 | Negishi | 81/467 |
| 5,394,775 | 3/1995 | Fagerstrom | 81/479 |

FOREIGN PATENT DOCUMENTS

| | | |
|---|---|---|
| 2829009 | 1/1980 | Germany . |
| 3318910 | 11/1984 | Germany . |
| 0755544 | 8/1980 | U.S.S.R. . |
| 0770611 | 3/1957 | United Kingdom . |

*Primary Examiner*—Michael Brock
*Attorney, Agent, or Firm*—Greer, Burns & Crain, Ltd.

[57] ABSTRACT

A fusion joint test system for a saddle fusion joint on a pipe includes a movable sealing mechanism and computer for automatically testing a saddle interface, or fusion joint. The test system controllably pressurizes a substantially isolated area about the fusion joint to a set pressure using a fluid pressure source. A pressure sensor senses a change in pressure about the fusion joint after pressurization and a computer electronically determines whether the fusion joint is within an acceptable integrity range.

13 Claims, 4 Drawing Sheets

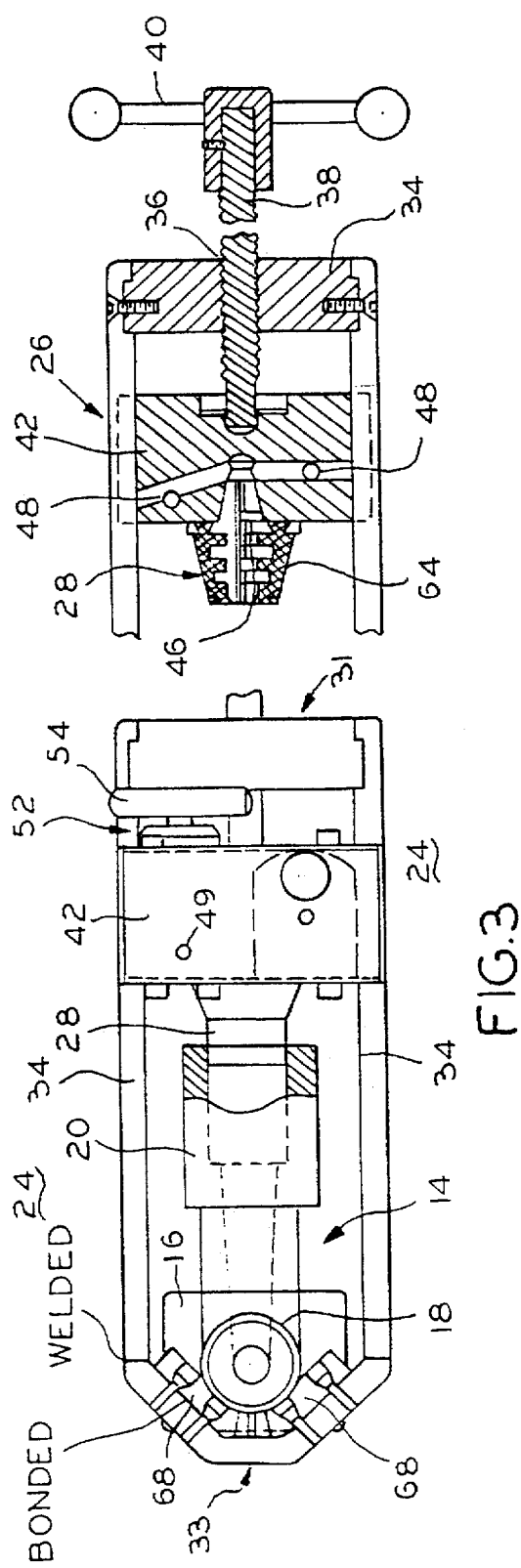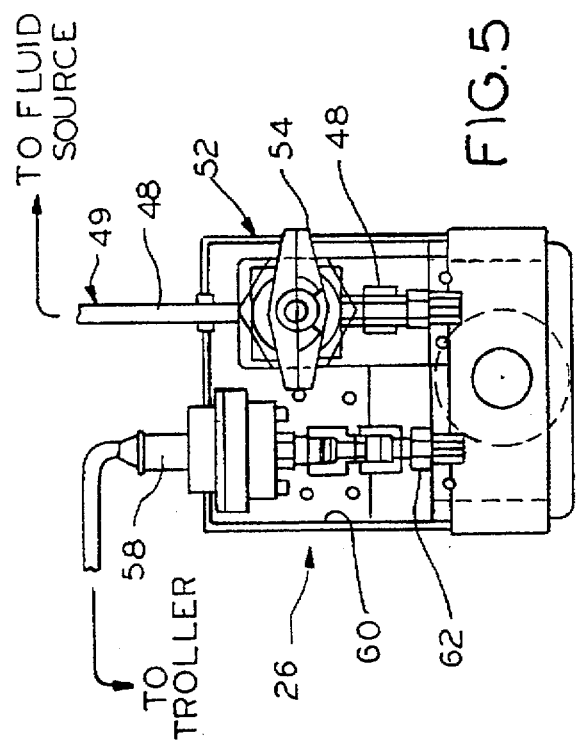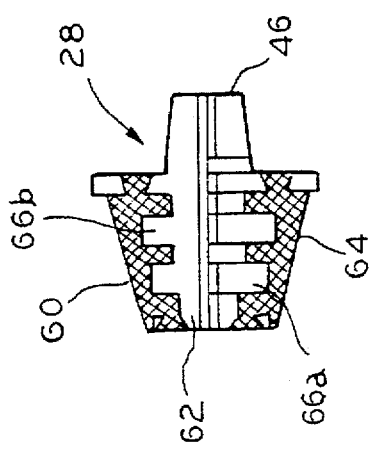

PNEUMATIC FUSION JOINT TEST SYSTEM AND METHOD

This invention relates generally to methods and apparatus for testing pipe joints, and more particularly, to methods and apparatus for testing, using fluid pressure, saddle fusion joints prepared on site when tapping into existing plastic pipe gas distribution pipelines.

CROSS REFERENCE TO RELATED APPLICATION

This application is related to a patent application entitled: "Method And Test Plug For Field Testing Pipe Joints" filed on even date and having the same inventors as instant application.

BACKGROUND OF THE INVENTION

Currently, plastic pipe gas distribution pipelines, such as polyethylene (PE) pipelines, are tapped on site for service lines by heat fusing a T-connector to the main pipeline. The T-connector has a saddle portion which is fused to an outer surface of the pipe forming a saddle fusion joint. An elongated threaded opening in the T-connector houses a threaded cutter that taps a hole in the pipe and serves as a shut off valve after the pipe is tapped. A service line outlet is provided in the side of the elongated threaded portion for releasing gas from the pipeline when the cutter is unthreaded.

The threaded cutter includes a threaded upper portion which cooperates with the internal threads of the threaded opening, and a lower portion with a sharp, thin, metal annulus which acts as the cutting edge. After the saddle portion is fused to the main pipeline, the cutter screws into the pipe surface so that the sharp edge cuts through the pipe wall. The cutter is then partially unscrewed and may be used as a valve to control gas flow.

However, as the cutter is screwed into the main pipeline, an upward force is exerted on the fused interface or fusion joint. If the saddle fusion joint is weak or faulty, the joint may become partially or completely detached from the pipe, possibly causing a leak. This can raise serious safety concerns. Also, a faulty joint after cutting or during cutting may leave the main pipeline with an unserviceable, partially or completely cut hole. This makes repair very difficult, particularly if gas is leaking from the pipe. Also, different saddle T-connector manufacturers make differing sized connectors thereby requiring a versatile testing system.

Thus, there is a need for methods and apparatus for testing the fusion interface joint before cutting the pipe. Accordingly, one object of this invention is to provide methods and apparatus for automatically testing pipe fusion joints that includes using a fluid pressure based testing system for testing the integrity of pipe fusion joints.

Still, another object is to provide methods and apparatus for testing fusion joints in pipes before the pipe is cut wherein unnecessary damage to the surface of the pipe is substantially avoided and the test system adapts to differing sized T-connectors.

Another object is to provide methods and apparatus for controllably testing fusion joints in pipes to detect relatively small leaks in the joint.

A further object of the invention is to provide methods and apparatus for automatically testing fusion joints in pipes having a computer based control system to facilitate detection of relatively small leaks from the fusion joint by accounting for pressure changes caused by visco-elastic properties of the test system to obtain accurate testing results.

SUMMARY OF THE INVENTION

In keeping with one aspect of this invention, an electronic fusion joint test system for automatically testing a saddle interface, or fusion joint, with a pipe is disclosed having a mechanism for controllably pressurizing a substantially isolated area about the fusion joint to a set pressure using a fluid pressure source. A pressure sensor senses a change in pressure about the fusion joint after pressurization and a computer electronically determines whether the fusion joint is within an acceptable integrity range.

More particularly, an adjustable sealing mechanism couples to the internal bore of the saddle connector to effectively seal an isolated area about the fusion joint. The sealing mechanism has passages therein to allow pressurization of the isolated area. The pressure sensor is located in the passage to sense the pressure in the isolated area. A valve in the passage prevents sourced fluid pressure from escaping the isolated area. A digital processing device, such as a portable computing device compares an actual sensed pressure, obtained from the sensor, to a desired control pressure value to determine whether a leak exists.

In one embodiment, the sealing mechanism includes a movable tapered neoprene seal with an internal passage for pressurizing the isolated area. The neoprene seal is compressible and has visco-elastic properties. The computer accounts for the visco-elastic properties of the seal prior to determining a change in pressure by waiting a predetermined time before obtaining the pressure value after initial pressurization.

Preferably, the movable seal is fixed to a housing that slidably engages with a frame. The housing also includes a fluid passage for receiving the pressure transducer, the fluid under pressure and a valve for regulating fluid in the passage. The movable seal is preferably affixed to the housing so that its passage is in fluid communication with the fluid passage in the housing. The seal may be a universal type seal such as a seal having a tapered outer surface to seal variable sized internal bores of differing sized saddle T-connectors.

In use, the preferred frame containing the movable seal and housing with the pressure transducer and the valve, is horizontally placed around an outer surface of the saddle T-connector. The frame is secured to the saddle connector through the tightening of the movable seal into the internal bore of the saddle. Tightening of the seal may occur using a threaded rod with a handle coupled to the housing. A cap is placed over any other openings in the saddle connector to isolate the area inside the saddle T-connector.

Once the area about the fusion joint is sealed, pressure from a pressure source, such as an air compressor, is fed into the passage within the housing. The computer measures the sourced fluid pressure using the pressure transducer and audibly and visually notifies the operator when a desired initial pressure has been reached. The operator then adjusts the valve to seal the isolated area. The computer waits for a predetermined period of time to account for viscoelastic related pressure changes to settle and reads the actual pressure in the isolated area. After a second predetermined period of time, the computer takes another pressure reading of the actual pressure and compares the two actual readings to determine the amount of change of pressure over a predetermined time. If the determination indicates that the change is improper, the computer notifies the operator of the poor integrity of the fusion joint.

BRIEF DESCRIPTION OF THE DRAWINGS

The above objects and features of the present invention will be more apparent from the description of the preferred embodiment with reference to the accompanying drawings wherein:

FIG. 3 is a partial top view and partial cross sectional end view of a saddle T-connector sealing mechanic including a pressure sensor and valve in accordance with one aspect of the invention;

FIG. 4 is cross sectional view of a universal seal in accordance with one embodiment of the invention;

FIG. 5 is a partial end view of the sealing mechanism of FIG. 3 with a potion of a cover removed showing a valve and pressure sensor.

DETAILED DESCRIPTION

Generally speaking, the test system detects a pressure drop in an isolated volume within the fused saddle connector after pressurizing the volume with compressed air or other fluid. A frame sealing assembly seals the volume and a computer is used to assist in pressurizing and monitoring the pressure in the isolated volume. A detected pressure drop will indicate a leak at the fusion interface and therefore identify a faulty fusion joint.

Figure 1:
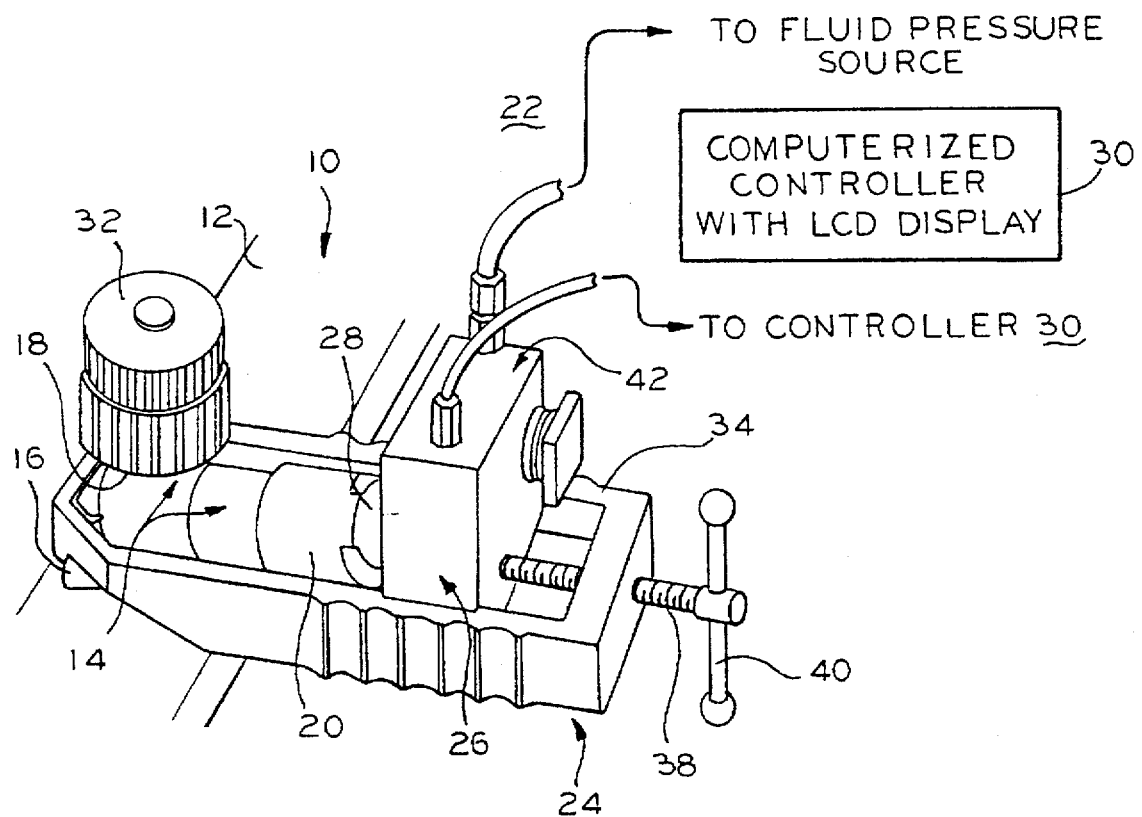
FIG. 1 is a perspective view of an embodiment of the invention attached to a saddle T-connector.

Referring now to FIG. 1, a pipe 10 has an outer surface 12. A conventional saddle T-connector 14 is heat fused to the outer surface 12 around the outer periphery of a saddle portion 16 (partially shown). An internal threaded bore 18 for receiving a pipe cutter, extends from the saddle portion 16 away from the pipe 10. A service line tap 20 having an internal fluid passage or bore in communication with the threaded bore 18 forms a "T" configuration.

The inventive saddle testing system 22 includes a sealing mechanism, such as a metal frame sealing assembly 24 that houses a valve and pressure sensing arrangement 26 along with a universal T-connector seal 28. The valve and pressure sensing arrangement 26 fluidly connects to the universal seal 28 through fluid passages. A computerized controller 30 with keyboard and display (not shown) for monitoring pressure, determining fusion joint fault conditions and interfacing with an operator, couples to the valve and pressure sensing arrangement 26. A cap 32, such as a manufacturer provided cap, is used to screwably attach to the threaded bore 18 where the cutter resides to seal the bore opening.

Figure 2:
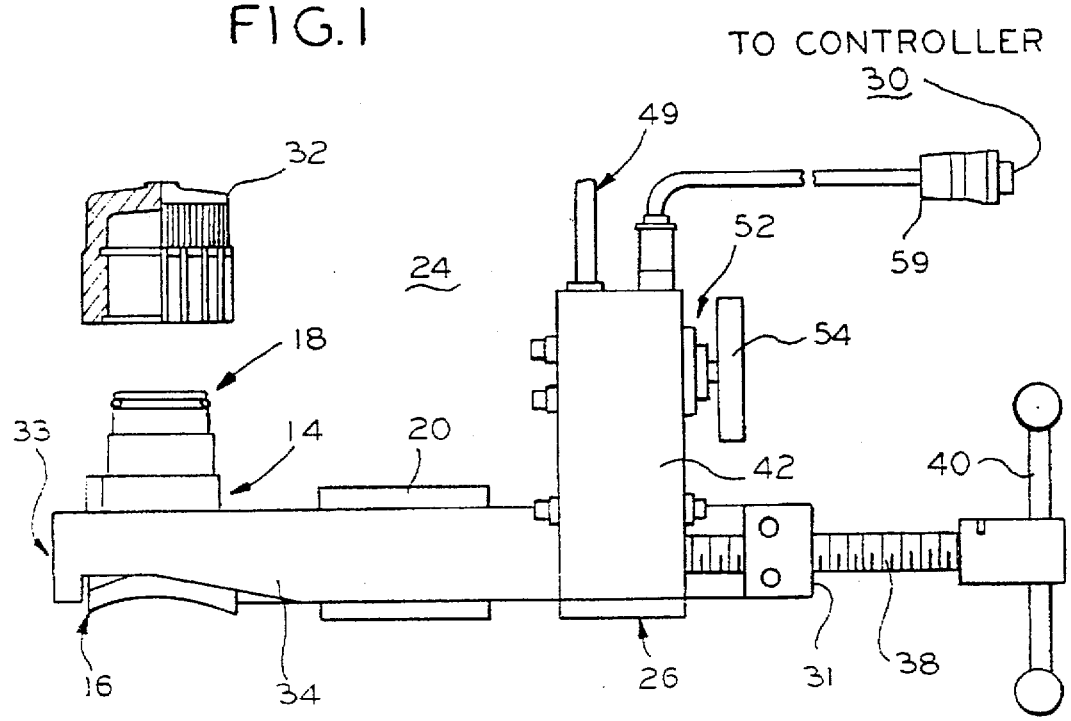
FIG. 2 is a side view of an embodiment of a sealing mechanism coupled to a saddle T-connector.

Referring to FIG. 2 and FIG. 3, the metal frame sealing assembly 24 is designed to horizontally clamp to an outer surface of the saddle T-connector 14. The metal frame assembly 24 has a base 31 and a flattened tip 33 at an opposing end forming a frame 34. The base 31 includes a threaded opening 36 for receiving a threaded adjustment rod 38. The adjustment rod 38 has a handle 40 for adjusting the universal seal. An aluminum block housing 42 contains the valve and pressure transducer arrangement 26. The housing 42 is slidably adjustable along the frame 34 in an axial direction. The universal seal 28 such as a tapered neoprene seal, is fixedly attached to a side of the housing 42 opposite a side receiving the adjusting rod 38.

Referring to FIGS. 3 and 5, the universal seal 28 has an internal seal passage 46 (FIG. 4) extending axially there through. The seal passage 46 is in fluid communication with a housing fluid passage 48 (FIG. 3) for receiving fluid from a pressure source, such as an air compressor. Hence the internal seal passage 46 is in fluid communication with the housing fluid passage 48. A tube end 49 of the fluid passage 48 includes a conventional male type ribbed end (not shown) for receiving a standard air chuck to facilitate connection to the fluid source.

The arrangement of passages 46 and 48 are such that they form a continuous passage and the only openings in the frame sealing assembly 24 are through the end 49 of passage 48 and an end of the universal seal 28. The passage 48 may be formed by drilling holes into the sides of the housing 42 and plugging the holes to seal the ends thereof. It will be recognized that tubing or other suitable material for defining fluid passages may also be used instead of an aluminum block.

The housing 42 contains the fluid passage 48 and, a valve 52. The valve 52 is disposed in the passage 48 and includes a knob 54 for adjusting the degree of openness of the valve. The valve 52 adjusts to completely seal the passage 48 to prevent fluid pressure from escaping. The housing fluid passage 48 is preferably bored into a lower section of the aluminum block housing 42.

The housing 42 also contains differential pressure transducer 58. The pressure transducer 58 may be an Omega PX 101-100G5V type transducer or any other suitable transducer that outputs a 1V–5V signal in response to pressure changes. The pressure transducer 58 is held in the housing 42 by a transducer bracket 60 or by any other suitable attachment. Transducer bracket 60 connects to an inner wall of the housing 42. Pressure transducer 58 has a tip 62 which is inserted into passage 48 and is thereby in fluid communication with passages 46 and 48. The passage 48 is extended through the use of common tube connectors (male and female connectors shown in FIG. 5) as known in the art, to allow the pressure transducer 58 to be in fluid communication with the passage 48. The pressure transducer 58 senses the pressure changes that occur within these passages and includes an electrical connector 59 to provide electrical data signals to a microprocessor portion of the controller 30. The data signals represent the measured pressure in the passage 48 and hence the isolated area.

Referring again to FIG. 4, the movable universal seal 28 preferably has a fruste-conical configuration or tapered outer surface 60 to seal variable sized internal bores. The universal seal 28 is formed by a plastic inner ribbed core 62 with at least a portion thereof surrounded by a compressible outer tapered cover 64, such as neoprene or similar material. The inner ribbed core has a series of circumferentially disposed ribs 66a–66b. The ribs 66a–66b vary in circumference by being smaller at a tip of the universal seal 28 and larger at a base thereof. The compressible outer tapered cover 64 has an internal surface for matingly engaging with the ribs.

The universal seal 28 is slidably moveable along the frame 34 axis by virtue of the adjustment rod 38 and rotating handle 40. For example, clockwise rotation of handle 40 will move the universal seal 28 toward the internal bore of the saddle T-connector 14 and toward the flattened tip 32 of the frame. Counter clockwise rotation of handle 40 will move the universal seal 28 in an opposite direction. The housing 42 may be notched to have shoulders on either side that ride along a top edge of the frame 34. The frame assembly 24 also includes rubber pads 68 attached along an inside face of flattened tip 33. The rubber pads will contact an outer surface of the saddle T-connector 14 when the universal seal 28 is tightly engaged in the service tap internal bore. The rubber pads 68 may be screwed or glued to the frame and prevent frictional damage to the outer surface of the T-connector 14.

As illustrated in FIG. 3, the tapered universal seal 28 frictionally engages with an internal bore opening of the service line tap 20 to prevent the ambient air from entering the inner isolated area of the saddle tee during testing. With the cap 32 sealing the main bore 18, the valve 52 sealing an end of passage 48 and the tapered universal seal 28 sealing the service line bore, the inside volume of the saddle T-connector 14 is substantially isolated.

Although the metal frame assembly 24 is shown connected to the service line tap 20, the assembly 24 can be suitably designed to be connected to the bore opening and a cap may be used to seal the service tap opening. Also, the pressure transducer 58 and valve 52 can measure and supply pressurized air in either opening. For example, a transducer and/or valve/transducer combination can be located in a cutter opening 18, or the transducer and valve can be in separated openings. However, it is preferable that the transducer and valve be located in the service opening.

In operation, after the fusion of the saddle T-connector 14 to the main pipe is complete, the service tap bore opening is sealed with the frame sealing assembly by horizontally orientating the frame 34 and turning the knob 40 to plug the service tap opening with the universal seal 28. The operator then attaches a source of compressed air, such as an air hose, to the end 49 of the passage 48. The valve 52 should preferably be open.

The controller 30 may be housed in a plastic or metal console (not shown) with a keyboard, push buttons and LCD display. Given the rugged environment in which the system must be used, the keypads are preferably built inside a lid and the LCD display and push buttons are preferably water/splash resistant. The controller 30 may be a suitably programmed computer, or other digital processing device, which includes a microcomputer, such as a Motorola 68HC11 microcomputer with associated memory, control circuitry, input circuitry and an interface (RS-232 or the like) to facilitate the operation as further described below.

Figure 6A:
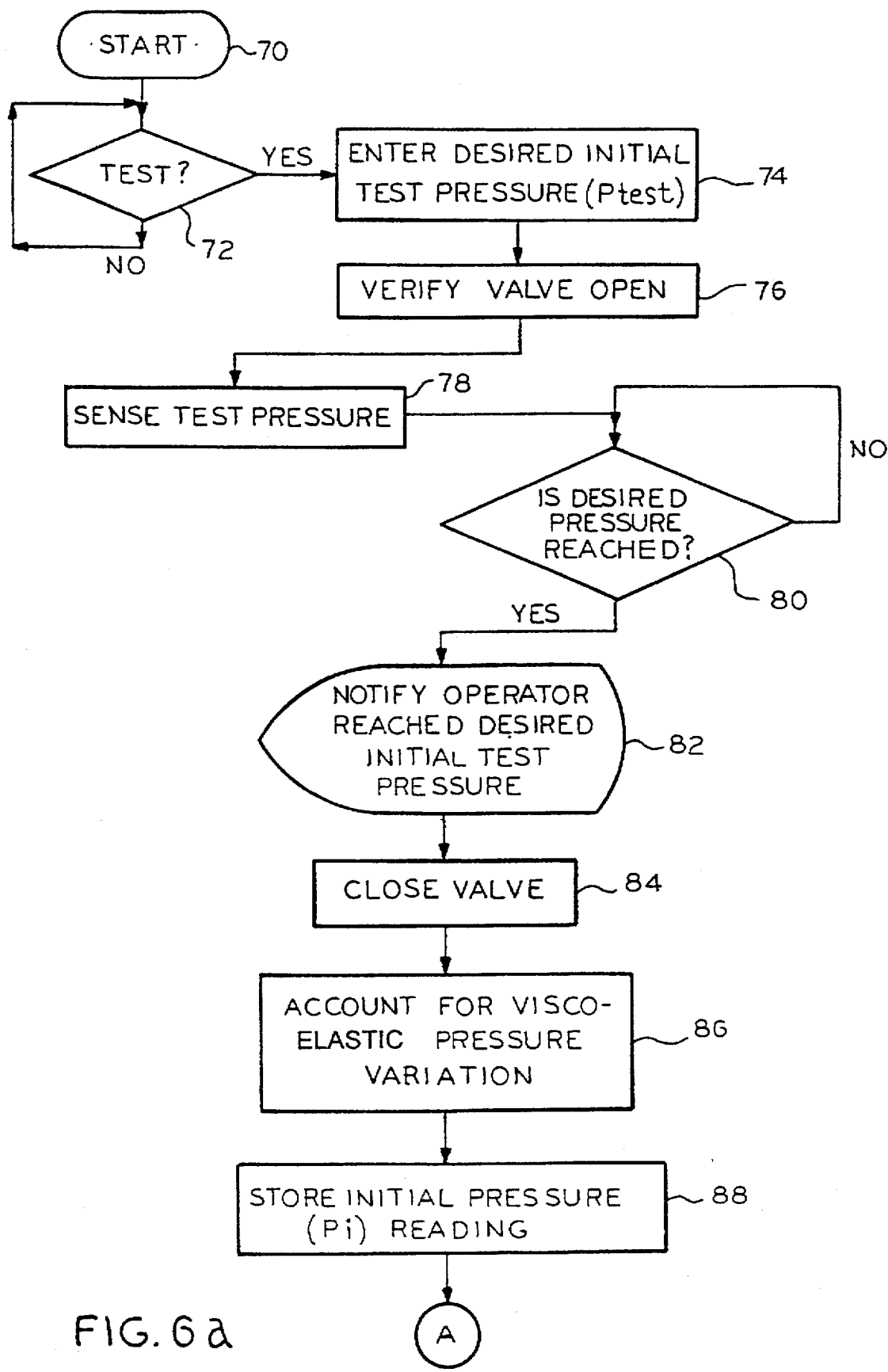
FIGS. 6a–6b show a block diagram generally depicting one embodiment of a method for testing pipe fusion joints in accordance with the invention.
Figure 6B:
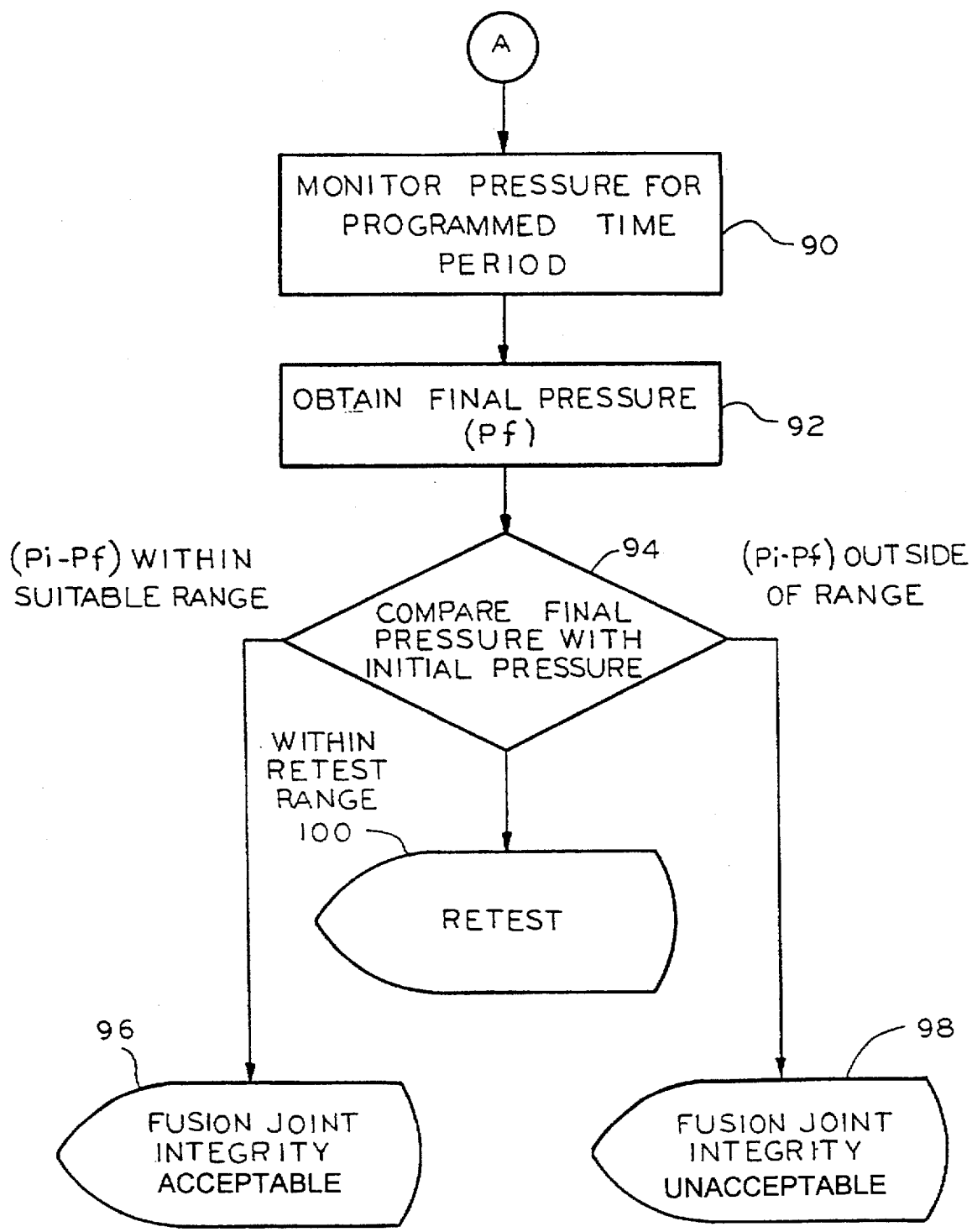

Turning now to FIGS. 6a–6b, after the frame assembly with sealing mechanism is in place, automatic testing of the fusion joint can begin as shown in block 70. First, the isolated area is pressurized to a predetermined level. In block 72, the controller 30 controls the LCD display in the console to display a message asking the operator if testing should begin. If the operator does not activate a start button on the console, the system will continue to prompt the operator to begin testing. As shown in block 74, if the operator activates the start button, the test system, via the controller 30, requests the operator to input the desired initial fluid pressure to which the isolated area is to be pressurized.

The operator enters a desired initial test pressure value ($P_{test1}$), preferably 100 psi, through a touchpad or keyboard in the console. This value is stored in memory for later comparison. The operator also verifies that the valve 52 is open to allow the fluid under pressure to enter the passage 48 and isolated area about the fusion joint as indicated in block 76. In block 78 the controller 30 senses the amount of fluid pressure in the isolated area by monitoring signals from the pressure transducer 58. The electronic signals from the pressure transducer 58 are read by a 16 bit A/D input on a microprocessor portion of the controller 30 as indicated by block 78. This allows for a relatively high resolution reading. The actual sensed test value ($P_{test2}$) is compared to the stored initial pressure value ($P_{test1}$) entered by the operator.

This automatic pressure sensing continues for a predetermined time period, such as 60 seconds or until the desired pressure of 100 psi is reached, as illustrated in block 80. The predetermined time period is programmed into memory of the controller 30. An internal timer is used to determine the amount of elapsed time. If the internal timer times out before the desired pressure is reached, the system continues to sense the pressure.

If the controller determines that the desired test pressure is reached, the operator is notified via the LCD display and audible alarm that the test pressure has been reached, as seen in block 82. Next, in block 84, the operator closes the valve 52 to prevent fluid pressure from escaping through the end 49. The fluid pressure source can be disconnected at this point if desired.

After the valve 52 is closed, the operator activates a test button to start the test. As shown in block 86, the controller accounts for pressure changes caused by visco-elastic changes in the universal seal 28 and plastic saddle T connector 14 to remove the variation from the analysis. It has been found that pressure drops in the isolated area can occur due to the expansion or contraction of the universal seal 28 and plastic T-connector when fluid pressure is initially applied. To compensate for the change in pressure, the controller 30 waits a predetermined period of time, such as 10 seconds before storing an initial pressure reading value (Pi) from the pressure transducer.

In block 88, the controller 30 then stores the initial pressure reading value (Pi) for later comparison. The controller 30 continues to monitor the pressure in the isolated area for a predetermined period of time, such as two minutes, as seen in block 90. The monitored pressure is continually displayed on the LCD for visual review by the operator. The predetermined time period is adjustable by entering a desired time into the controller 30. During this period, the controller 30 stores samples of actual pressure readings to determine the rate of pressure change, if any. A suitable criterion for measuring the pressure drop is if the pressure drops less than 10 inches of water in two minutes for the fusion joint to be pronounced acceptable. This value was chosen to eliminate pressure changes arising from the minute deformation of the neoprene seal 28. The visco-elastic deformation occurs because of the applied pressure and temperature changes of the compressed air.

After the period has ended, the controller obtains and stores a final pressure reading value (Pf) as indicated in block 92. Next, in block 94, the controller 30 compares the final pressure reading value (Pf) with the initial pressure reading value (Pi) to determine the integrity of the fusion joint.

The range of pressure change and rate of change of pressure changes determines the integrity of the tested fusion joint. These ranges are stored in the controller. For example, if (Pi-Pf) is within a suitable range, such as between 0 psi and 0.41 psi, the fusion joint integrity is considered acceptable and the controller will visually display "GOOD JOINT" as shown in block 96. If (Pi-Pf) is far enough outside the acceptable range, such as greater than 0.55 psi, the controller 30 will display "BAD JOINT" as shown in block 98. Finally, as indicated by block 100, if the pressure difference is outside the acceptable range but within the unacceptable range, such as between 0.42 psi and 0.55 psi, the controller 30 will display "RETEST" and prompt the operator to retest the fusion joint.

In summary, compressed fluid, such as air at about 100 psi, is supplied by a fluid source through the passage 48 until a desired pressure is reached, thereby pressurizing a substantially isolated area about the fusion joint to a set pressure. By reading the signals from the pressure transducer 58, the microprocessor senses a change in pressure about the fusion joint. The pressure in the saddle cavity is monitored by the controller for a predetermined period of time. The controller determines, based on the sensed change in pressure, whether the fusion joint is within an acceptable integrity range. If the pressure decreases by more than a set amount indicating a leak, the saddle joint is deemed to be faulty. If on the other hand, the pressure does not decrease or decreases by less than a set amount, the saddle joint is deemed to be satisfactory.

The advantages of this invention are now apparent. The heat fused joint may be tested before the pipe is cut. The pipe is not damaged during the testing process and mechanical test plugs are eliminated. The above described automated interactive fluid pressure test system detects small fusion joint test leaks and takes into account visco-elastic effects of the sealing mechanism.

While the principles of the invention have been described above in connection with specific apparatus and applications, it is to be understood that this description is made only by way of example and not as a limitation on the scope of the invention. As one of ordinary skill in the art will appreciate, modification and variations may be made to the fusion interface test system without departing from the scope and spirit of the invention.

We claim:

1. A method for testing a saddle fusion joint with a pipe, the saddle having a housing with an internal bore for channeling fluid from the pipe, a saddle portion extending from the bottom of the housing having a fusion joint with the pipe, said method comprising the steps of:

pressurizing a substantially isolated area within the saddle housing about the fusion joint to a set pressure using a movable sealing mechanism that couples to the internal bore from a frame so dimensioned as to couple to an outer portion of the saddle;

sensing a change in pressure about the fusion joint after pressurizing the substantially isolated area;

electronically determining, based on periodic sensed change in pressure, whether the fusion joint is within an acceptable integrity range; and providing an operator message indicating the determined integrity of the fusion joint.

2. The method of claim 1 wherein the step of determining includes the steps of:

waiting a first predetermined period of time prior to obtaining an initial pressure reading value to account for visco-elastic variations in a sealing mechanism for the internal bore;

waiting a second predetermined period of time prior to obtaining a final pressure reading value;

comparing the initial pressure reading value with the final pressure reading valve.

3. An electronic fusion joint test system for automatically testing a saddle interface with a pipe, the saddle having a housing with an internal bore for channeling fluid from the pipe, a saddle portion extending from the bottom of the housing having a fusion joint with the pipe, the test system comprising:

means having a sealing mechanism including a frame for coupling to an outer portion of the saddle and a movable seal for coupling to the internal bore for controllably pressurizing a substantially isolated area within the saddle portion about the fusion joint to a set pressure using a fluid pressure source;

means for sensing a change in pressure about the fusion joint after pressurization by the means for pressurizing; and means, responsive to the sensing means, for electronically determining whether the fusion joint is within an acceptable integrity range.

4. The fusion joint test system of claim 3 wherein the sealing mechanism includes a valve for preventing sourced fluid pressure from escaping the isolated area.

5. The fusion joint test system of claim 3 wherein the means for sensing is in fluid connection with the isolated area and includes a pressure transducer for generating a signal in response to pressure changes in the isolated area.

6. The fusion joint test system of claim 3 wherein the means for determining is comprised of a digital processing device for comparing an actual sensed pressure, obtained from the sensing means, to a desired control pressure value also obtained from the sensing means.

7. The fusion joint test system of claim 3 wherein a housing contains the movable seal, a fluid passage for receiving a pressure transducer and a valve for regulating fluid in the passage, and wherein the housing slidably engages with the frame to allow the movable seal to engage with the internal bore.

8. The fusion joint test system of claim 7 wherein the movable seal has an internal seal passage in fluid communication with the fluid passage in the housing.

9. The fusion joint test system of claim 8 wherein the movable seal includes a tapered outer surface to seal variable sized internal bores.

10. The fusion joint test system of claim 3 wherein the movable seal includes an inner ribbed core with at least a portion thereof surrounded by a compressible outer tapered cover.

11. The fusion joint test system of claim 3 wherein the movable seal is axial movable with the frame to seal the internal bore.

12. The fusion joint test system of claim 3 wherein the means for electronically determining is comprised of a digital processing unit programmed to wait a predetermined period of time prior to obtaining a pressure reading from the sensing means in the isolated area, to account for pressure changes attributable to visco-elastic properties of a seal in the means for pressurizing.

13. A fusion joint test system for automatically testing a saddle interface with a pipe, the saddle having a housing with an internal bore for channeling fluid from the pipe, a saddle portion extending from the bottom of the housing having a fusion joint with the pipe, the test system comprising:

means for pressurizing a substantially isolated area about the fusion joint to a predetermined pressure, including a pressure source and a movable sealing mechanism for coupling to the internal bore, wherein the movable sealing mechanism includes a tapered seal and an adjustment rod in a frame, the frame so dimensioned to couple to the saddle housing, and wherein the adjustment rod axially moves the tapered seal to engage with the internal bore;

means for sensing a change in pressure about the fusion joint after pressurization by the means for pressurizing; and means, responsive to the sensing means, for electronically determining an amount of pressure change as a basis for evaluating the integrity of the fusion joint.

* * * * *